US010280266B2

(12) United States Patent
Son et al.

(10) Patent No.: US 10,280,266 B2
(45) Date of Patent: May 7, 2019

(54) CURABLE PETROLEUM RESIN AND METHOD FOR PREPARING SAME

(71) Applicant: KOLON INDUSTRIES, INC., Gwacheon-si, Gyeonggi-do (KR)

(72) Inventors: Jung Soon Son, Yongin-si (KR); Myung Jong Kim, Yongin-si (KR); Won Seok Gong, Yongin-si (KR); Jun Hyo Park, Yongin-si (KR)

(73) Assignee: KOLON INDUSTRIES, INC., Gwacheon-si (KR)

( * ) Notice: Subject to any disclaimer, the term of this patent is extended or adjusted under 35 U.S.C. 154(b) by 0 days.

(21) Appl. No.: 15/500,580

(22) PCT Filed: Aug. 3, 2015

(86) PCT No.: PCT/KR2015/008086
§ 371 (c)(1),
(2) Date: Jan. 31, 2017

(87) PCT Pub. No.: WO2016/018131
PCT Pub. Date: Feb. 4, 2016

(65) Prior Publication Data
US 2017/0218131 A1   Aug. 3, 2017

(30) Foreign Application Priority Data

Aug. 1, 2014 (KR) .......................... 10-2014-0098848
Jul. 31, 2015 (KR) .......................... 10-2015-0108441

(51) Int. Cl.
*C08G 77/42* (2006.01)
*C08F 220/04* (2006.01)
*C08F 240/00* (2006.01)
*C08F 289/00* (2006.01)
*C08F 2/06* (2006.01)
*C08F 232/08* (2006.01)
*C09J 145/00* (2006.01)

(52) U.S. Cl.
CPC ............... *C08G 77/42* (2013.01); *C08F 2/06* (2013.01); *C08F 220/04* (2013.01); *C08F 232/08* (2013.01); *C08F 240/00* (2013.01); *C08F 289/00* (2013.01); *C09J 145/00* (2013.01)

(58) Field of Classification Search
CPC .......... C08G 77/42; C08F 232/08; C08F 2/06; C08F 289/00; C08F 220/04; C08F 240/00; C09J 145/00
See application file for complete search history.

(56) References Cited

U.S. PATENT DOCUMENTS

| 3,968,088 | A | * | 7/1976 | Asai ...................... C08F 232/06 526/283 |
| 7,666,966 | B2 | | 12/2010 | Sugawara |
| 8,101,697 | B2 | | 1/2012 | Pawlow et al. |
| 2011/0104488 | A1 | | 5/2011 | Mussig et al. |
| 2014/0144573 | A1 | * | 5/2014 | Blok ...................... B29B 9/065 156/110.1 |

FOREIGN PATENT DOCUMENTS

| CA | 2242060 A | * | 6/1999 |
| JP | 2-185558 A | | 7/1990 |
| JP | 2-258787 A | | 10/1990 |
| JP | 11-080698 A | | 3/1999 |
| JP | 2002-322185 A | | 11/2002 |
| KR | 10-2014-0047659 A | | 4/2014 |
| WO | WO2012050667 | * | 4/2012 |

OTHER PUBLICATIONS

Chinese Patent Office, Office Action issued in corresponding Chinese Application No. 104125005.
International Searching Authority, International Search Report for PCT/KR2015/008086 dated Nov. 11, 2015.
Japanese Patent Office, Communication dated Dec. 5, 2017, from the Japanese Patent Office in counterpart application No. 2017-504356.

* cited by examiner

*Primary Examiner* — Robert S Jones
(74) *Attorney, Agent, or Firm* — Sughrue Mion, PLLC

(57) ABSTRACT

This invention provides a method of manufacturing a curable petroleum resin and a curable petroleum resin obtained therefrom. The method includes (a) a process of thermally polymerizing a composition for polymerization which includes silanes and monomers, including cyclic olefins having at least one ethylenically unsaturated group selected from among C5 fractions, C9 fractions, and dicyclopentadiene of naphtha cracking, thereby enabling petroleum resins, which are thermoplastic resins, to be applied as reactive adhesives, and ultimately being capable of providing eco-friendly reactive adhesives.

17 Claims, 6 Drawing Sheets

CURABLE PETROLEUM RESIN AND METHOD FOR PREPARING SAME

TECHNICAL FIELD

The present invention relates to a curable petroleum resin and a method of manufacturing the same.

BACKGROUND ART

Recently, the automobile industry has been aiming to achieve fuel efficiency improvements to meet future legal standards and to reduce the weight of vehicle bodies as a measure to respond to exhaust gas regulations. The body is the heaviest component of the vehicle, accounting for about 40% of the vehicle's total weight.

When the weight of the vehicle body is reduced by about 100 kg, $CO_2$ emission amounts are reduced by 5.0 to 12.5 g. In addition to steel, low-density materials such as aluminum, magnesium and plastic/thermosetting composite materials may be used to reduce the weight of the vehicle body. Accordingly, the diversity and importance of the materials are increasing, and combination with novel materials and adhesion technology and materials that can provide structural merits need to be developed.

Automotive adhesives may be classified into structural adhesives, semi-structural adhesives, non-structural adhesives, double-sided tapes (adhesives), and sealants depending on their strength properties. Examples of the main components of the adhesives/sealants may include PVC, acrylic emulsion, epoxy, urethane, acryl/urethane, and synthetic rubber.

Particularly, urethane-based adhesives are frequently used for automobile interior materials. Reactive hot melts based on urethane chemistry are expensive and poor in terms of safety due to isocyanate included therein. Accordingly, there has been a continuing need for eco-friendly adhesive compositions that can be used in place of urethane-based adhesives.

In order to respond to this need, a variety of polyolefin-based compounds and reactive adhesive compositions including the polyolefin-based compounds may be considered.

U.S. Patent No. 2005/0043455 discloses a crystalline polyolefin homopolymer or copolymer wax which is modified with a silane compound using a free radical reaction and which has a viscosity of 10 to 50,000 mPa·s when measured at 170° C. and a heat of fusion of more than 10 J/g. The silane compound used for the modification includes one or more olefinic double bonds and one or more alkoxy radicals directly attached to the silicon. The polyolefin wax used for the modification is manufactured using a metallocene catalyst. This reference document discloses that a free radical initiator is used in a large amount of 0.1 to 10 wt % based on the polyolefin wax, relative to a silane amount of 0.1 to 40 wt % based on the polyolefin wax.

Further, EP 0944670B1 discloses a crosslinkable elastomer composition that includes a silane-grafted ethylene alpha-olefin interpolymer elastomer having a hardness (Shore A) of 85 or less, and optionally a crystalline olefin polymer. Exposure to water makes it possible to convert the crosslinkable composition into a non-porous, grafted, and crosslinked elastomeric composition having a hardness (Shore A) of 85 or less, and also abrasion resistance greater than that of the crosslinkable composition. This patent discloses that silane is preferably used in an amount of 0.1 to 3.5 wt % and that the ratio of silane to the initiator that is used is relatively high, namely 10:1 to 30:1.

International Publication WO 2005/100501 discloses an article, including 1) a functionalized component, 2) a tackifier, and 3) an olefin polymer, which includes one or more C3 to C40 olefins and optionally one or more diolefins and at most 5 moles of ethylene, and which has a dot T-peel of 1 N or more, a branching index (g') of 0.95 or less when measured at Mz of a polymer, and a Mw of 100,000 or less. The functional performance is selected from the group consisting of functionalized polymers, functionalized oligomers, and beta nucleation agents. Experimental examples of this reference document relate mainly to a polypropylene-based polymer that is grafted with maleic anhydride.

U.S. Pat. No. 5,824,718 discloses a substantially linear curable ethylene polymer which is useful for wires, cable coatings, weather stripping, and fibers and which is grafted with silane. The silane-grafted polymer may or may not be filled, and cures rapidly compared to many commercial coatings. This patent discloses an ethylene/α-olefin base polymer having a preferable melt index (I2) of 0.5 to 200 g/10 min. See also related patents U.S. Pat. Nos. 5,741,858 and 6,048,935. U.S. Pat. No. 4,806,594 discloses a water-curable composition that includes (a) one or more polymers selected from the group consisting of silane-grafted homopolymers of ethylene, propylene, or 1-butene. In the Example of this patent, polyethylene, having a relatively high molecular weight, is silanized.

U.S. Pat. No. 5,995,474 discloses an adhesive composition including substantially amorphous silane-grafted poly-α-olefin. The adhesive composition is manufactured by grafting a silane compound, having a moiety containing one to three alkoxy groups and one or more olefinic double bonds directly attached to silicon on substantially amorphous poly-α-olefin, and subsequently performing cross-linking using water. This patent relates mainly to a propylene-based polymer.

However, in the case of a known method of silane modification (grafting) where a curable petroleum resin is manufactured to apply to a reactive adhesive, the grafting ratio of the silane compound is low. Accordingly, it insufficiently exhibits a desired curing rate and adhesion strength.

DISCLOSURE

Technical Problem

Accordingly, the present invention has been made keeping in mind the above problems occurring in the related art, and an object of the present invention is to provide a method of manufacturing a petroleum resin of a curable form in manufacturing petroleum resin from monomers derived from a C5 fraction, a C9 fraction, and dicyclopentadiene of naphtha cracking.

Particularly, the present invention provides a method of manufacturing a petroleum resin as copolymerizing silanes so that a silane content is high, in other words, so that the resin can be cured in manufacturing petroleum resin from monomers derived from a C5 fraction, a C9 fraction, and dicyclopentadiene and so on.

Another object of the present invention is to provide a curable petroleum resin having a high silane content.

Technical Solution

In order to accomplish the above objects, the present invention provides a method of manufacturing a curable petroleum resin, the method including a process of thermally polymerizing a composition for polymerization which includes (a) monomers including cyclic olefins having at least one ethylenically unsaturated group selected from among C5 fractions of naphtha cracking, C9 fractions of naphtha cracking and dicyclopentadiene of naphtha cracking, and (b) one or more silanes represented by the following Chemical Formula 1.

  Chemical Formula 1

$$CH_2=CR-(COO)_x(C_nH_{2n})_y SiR'_3$$

In the above Chemical Formula, R is a hydrogen atom or a methyl group; x and y are 0 or 1, provided that y is 1 when x is 1; n is an integer of 1 to 12; and R's are each independently an alkoxy group having 1 to 12 carbon atoms, an aryloxy group, an araloxy group, an aliphatic acyloxy group having 1 to 12 carbon atoms, an amino or substituted amino group, or a lower alkyl group having 1 to 6 carbon atoms, provided that two or less of the three R' groups are alkyl groups.

In a preferable embodiment, the silanes may be selected from the group consisting of vinyltrimethoxysilane, vinyltriethoxysilane, and 3-(trimethoxysilyl)propyl methacrylate.

In the preferable embodiment, the thermally polymerizing the composition may be performed at a reaction temperature of 150 to 300° C. for 1 to 3 hours under a predetermined pressure.

In a specific embodiment, the monomers may include dicyclopentadiene.

In the preferable embodiment, the composition for polymerization may include a non-polymerizable solvent having no ethylenically unsaturated double bond.

In the preferable embodiment, the composition for polymerization may include 5 to 50 wt % of the silanes based on the total weight of the silanes and the monomers.

In the preferable embodiment, the composition for polymerization may include the non-polymerizable solvent in an amount set so that the total concentration of the monomers and the silanes is 30 to 70 wt %.

In the specific embodiment, the method of the present invention may include degassing and concentration processes after the thermally polymerizing the composition.

In order to accomplish the above objects, the present invention also provides a curable petroleum resin including a repeating unit derived from monomers including cyclic olefins having at least one ethylenically unsaturated group selected from among C5 fractions, C9 fractions, and dicyclopentadiene of naphtha cracking. Silanes are copolymerized, and the proton content of the silanes, determined using $^1$H-NMR, is at least 1.7%, preferably 3% or more, and more preferably 7% or more.

Throughout the specification, the proton content of the silanes is measured using $^1$H-NMR, and is defined as a value obtained by calculating a ratio (%) of the area of the peak, corresponding to R' (alkoxy group) derived from the silanes, with respect to the integral value of all peaks in an NMR analysis graph.

In the curable petroleum resin according to the preferable embodiment of the present invention, a Si weight ratio, which is the weight ratio of a silicon (Si) element to all elements, analyzed using an X-ray fluorescence spectrometer, may be at least 0.3 wt %, preferably 0.8 wt % or more, and more preferably 2 wt % or more.

The curable petroleum resin according to the preferable embodiment may be obtained by copolymerizing one or more silanes represented by Chemical Formula 1. The silanes according to the preferable embodiment may be selected from the group consisting of vinyltrimethoxysilane, vinyltriethoxysilane, and 3-(trimethoxysilyl) propyl methacrylate.

In a specific embodiment, the monomers may include dicyclopentadiene.

In the preferable embodiment, the curable petroleum resin may have a weight average molecular weight (Mw) of 500 to 2000.

In the preferable embodiment, the curable petroleum resin may have a softening point of 70 to 150° C.

Advantageous Effects

The present invention provides a method of manufacturing a petroleum resin from monomers, which are derived from a C5 fraction, a C9 fraction, and dicyclopentadiene of naphtha cracking, by copolymerizing silanes so that the silane content is high and so that the resin can be cured. Thereby, a curable petroleum resin having a high silane content is provided, thus contributing to the development of a petroleum resin useful as a reactive adhesive.

BEST MODE

Figure 1:
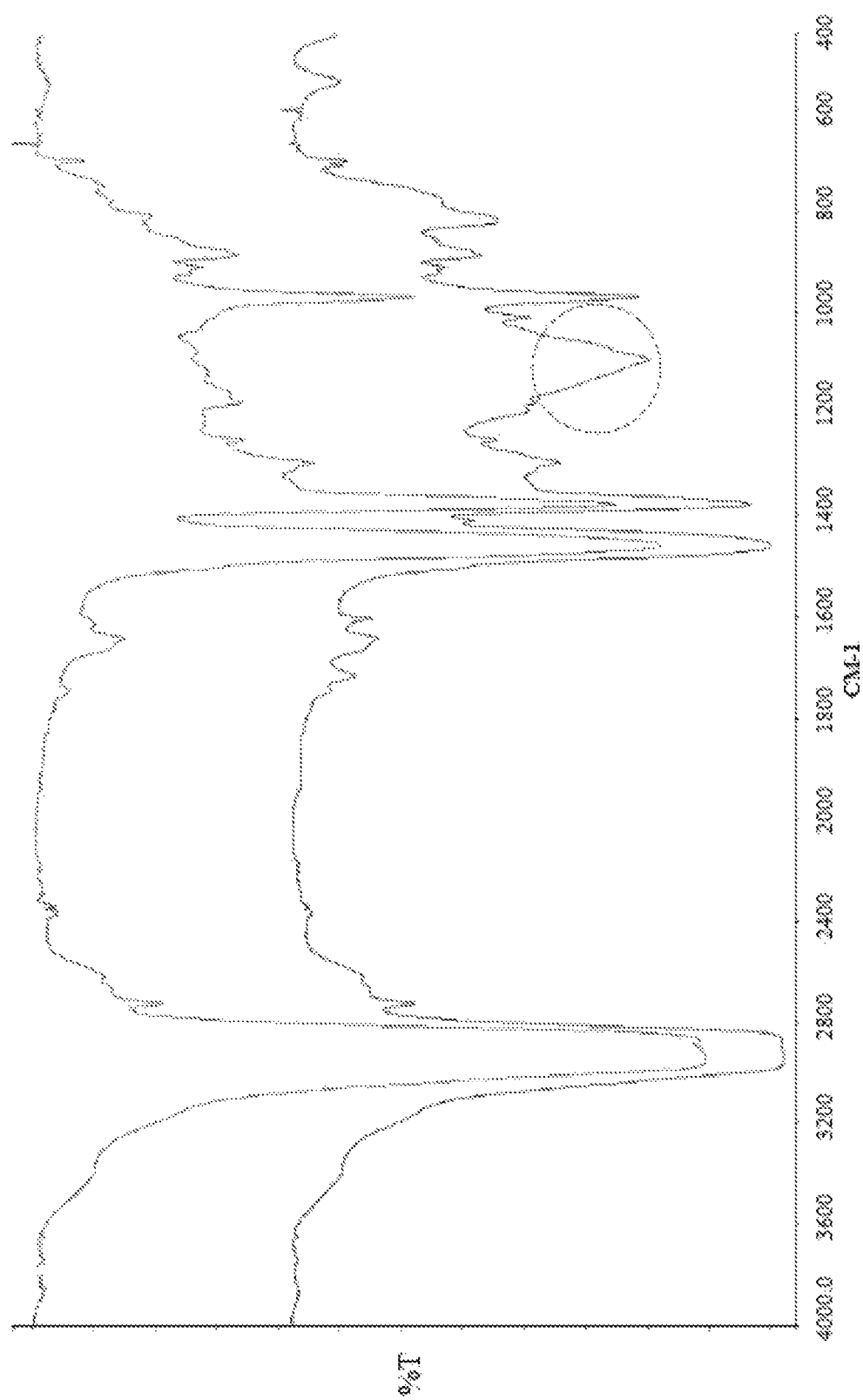
FIG. 1 is a graph of the FT-IR analysis of a product (Control, the upper graph), commercially available as a C5-based resin, and a resin (Reference Example 2, the lower graph) obtained by grafting silane of the complete resin product in the presence of an initiator.

The present invention will be described in greater detail.

A general petroleum resin is thermoplastic, and is easily softened when heated and hardened when cooled. The reason is as follows. The petroleum resin is manufactured using polymerization of olefins and/or diolefins, such as a C5 fraction, a C9 fraction, and dicyclopentadiene, in raw materials, and accordingly, double bonds remain in the resin but there are no reaction sites for crosslinking and curing.

Further, a conventional petroleum resin is a tackifier, and has been used for the purpose of realizing compatibility with polymers and the adhesion performance. Accordingly, the conventional petroleum resin has not been considered for use as a reactive type. The major use of the petroleum resin may include applications to adhesives, road markings, tapes, paints, and tires.

The present invention is based on the fact that silanes are copolymerized in order to enable the petroleum resin to be curable.

However, conventional techniques known as methods of grafting silane to polyolefins include a manufacturing method for causing cross-linking between internal or different polymers using a silane-coupling agent. In this method, an initiator, for example, a peroxide, is added to a polymer, which causes an addition reaction of the silane-coupling agent to the end of the polymer chain. More specifically, the silane may be typically grafted to the polymer using any conventional method or ionizing radiation in the presence of a free radical initiator, for example, peroxide and azo compounds. Any organic initiator, for example, a peroxide initiator, may be useful. Examples of the initiator may include dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(tert-butylperoxy)hexane, lauryl peroxide and tert-butyl peracetate, t-butyl α-cumyl peroxide, di-t-butyl peroxide, di-t-amyl peroxide, t-amyl peroxybenzoate, 1,1-bis(t-butylperoxy)-3,3,5-trimethylcyclohexane, α,α'-bis(t-butylperoxy)-1,3-diisopropylbenzene, α,α'-bis(t-butylperoxy)-1,4-diisopropylbenzene, 2,5-bis(t-butylperoxy)-2,5-dimethylhexane, and 2,5-bis(t-butylperoxy)-2,5-dimethyl-3-hexyne.

When the silane is grafted using the above-described known method, the degree of grafting of the grafted polymer and the degree of crosslinking of the cured polymer may vary depending on the amount of initiator and silane that are used. However, when the silane is grafted to a thermoplastic petroleum resin using the above-described method, a resin to which the silane is grafted in a content of only about 1% may be obtained. Accordingly, it is difficult to use this resin as a reactive adhesive.

Therefore, a method of manufacturing the curable petroleum resin according to the present invention does not include a process of reacting the silane-coupling agent in the presence of the initiator using the petroleum resin as a starting material, but includes a polymerization process, particularly a thermal polymerization process, in which the silane-coupling agent is added together with monomers to manufacture the petroleum resin.

Specifically, an embodiment of the present invention is a method of manufacturing a curable petroleum resin, the method including a process of thermally polymerizing a composition for polymerization which includes (a) monomers, including cyclic olefins having at least one ethylenically unsaturated group selected from among C5 fractions, C9 fractions, and dicyclopentadiene of naphtha cracking, and (b) one or more silanes represented by the following Chemical Formula 1.

   Chemical Formula 1

In the above Chemical Formula, R is a hydrogen atom or a methyl group; x and y are 0 or 1, provided that y is 1 when x is 1; n is an integer of 1 to 12 and preferably 1 to 4; and R's are each independently an organic group including an alkoxy group having 1 to 12 carbon atoms (for example, methoxy, ethoxy, or butoxy), an aryloxy group (for example, phenoxy), an araloxy group (for example, benzyloxy), an aliphatic acyloxy group having 1 to 12 carbon atoms (for example, formyloxy, acetoxy, or propanoyloxy), an amino or substituted amino group (alkylamino or arylamino), or a lower alkyl group having 1 to 6 carbon atoms (without limitation thereto), provided that one or less of the three R' groups is alkyl. In another embodiment, two or less of three the R' groups are alkyl.

Suitable silanes include unsaturated silanes including an ethylenically unsaturated hydrocarbyl group, for example, a vinyl, allyl, isopropenyl, butenyl, cyclohexenyl, or γ-(meth) acryloxy allyl group, and a hydrolysable group, for example, a hydrocarbyloxy, hydrocarbonyloxy, or hydrocarbylamino group. Examples of the hydrolysable group include methoxy, ethoxy, formyloxy, acetoxy, propionyloxy, alkyl, and arylamino groups. The preferable silane is an unsaturated alkoxy silane that can be grafted to the polymer. The preferable silane includes vinyltrimethoxysilane, vinyltriethoxysilane, 3-(trimethoxysilyl)propyl methacrylate (γ-(meth)acryloxypropyl trimethoxysilane), and a mixture thereof.

When the composition for polymerization including the silanes and the monomers is thermally polymerized, the reaction may be performed under a predetermined pressure, for example, in an autoclave. The internal pressure of the reactor may be about 20 to 25 bar.

Accordingly, thermal polymerization may be performed at a reaction temperature of 150 to 300° C. for 1 to 3 hours under a predetermined pressure, thus obtaining the petroleum resin including the silanes which are copolymerized at a high ratio.

C5 fractions, C9 fractions, and dicyclopentadiene included in the monomers are obtained as products of naphtha cracking. Among the products of naphtha cracking, products having four or fewer carbon atoms are separated and purified to be usefully applied to the petrochemical industry. However, most of the C5 fraction, having five carbon atoms, is combusted to be used as fuel, and a portion thereof is separated and purified to be industrially applied in various businesses. The C5 fractions consist mostly of cyclopentadiene, and most cyclopentadiene is dimerized, thus being present in a dicyclopentadiene form. The petroleum hydrocarbon resin of the present invention may include the monomers including the C5 fractions, the C9 fractions, and dicyclopentadiene, which are obtained as the products of naphtha cracking, as main components, and particularly cyclic monomers having an ethylenically unsaturated double bond.

When the petroleum resin is manufactured using the cyclic monomers having the ethylenically unsaturated double bond together with the silanes through thermal polymerization, an addition reaction of the ethylenically unsaturated double bond of the silanes to the ethylenically unsaturated double bond of the monomers constituting the repeating unit may occur. The monomers according to the preferable embodiment of the present invention include dicyclopentadiene as a main component.

An ionic polymerization method using a Friedel-Craft catalyst may be considered to polymerize the fractions such as dicyclopentadiene. However, copolymerization with the silanes is not achieved using the above-described method, and the silane-copolymerized petroleum resin may be manufactured only when thermal polymerization is performed at a high temperature of about 150 to 300° C., as in the present invention. An additional initiator is not required during the thermal polymerization. That is, an addition reaction readily occurs even when the initiator is not used. As the polymerization time is increased, the content of the silane in the resin is increased, but the softening point or the molecular weight is also increased. Accordingly, the polymerization time may be appropriately set to about 1 to 3 hours.

The monomers and the silanes are polymerized in the presence of a solvent using the thermal polymerization. As for the solvent, a non-polymerizable solvent is preferably used in terms of the high silane content. A solvent having an ethylenically unsaturated double bond in the molecular structure thereof may participate in the polymerization reaction during the thermal polymerization, thus serving as a factor preventing the silanes from participating in the copolymerization reaction.

Examples of the non-polymerizable solvent may include xylene, toluene, or cyclohexane.

Meanwhile, during the thermal polymerization process, the composition for polymerization may include the silanes in an amount of 5 to 50 wt % based on the total weight of the silanes and the monomers (that is, the total monomer weight). As the amount of the silanes that are used is increased, the silane content is increased, but a yield or a softening point and the degree of polymerization may be reduced. Accordingly, in consideration of various factors, the amount of the silanes used may be about 5 to 50 wt %, preferably 10 to 25 wt %, and more preferably 10 to 20 wt % based on the total weight of the silanes and the monomers.

Meanwhile, the monomers and the silanes may be used at the above-described weight ratio, and the non-polymerizable solvent may be added in an amount set so that the total concentration of the monomers and the silanes is 30 to 70 wt %, for the purpose of dilution, thereby obtaining the composition for polymerization.

The reactants are thermally polymerized under the above-described condition and then cooled to room temperature, and the pressure is relieved, thereby obtaining a polymer. An unreacted material or a solvent is included in the polymer. Materials other than the silane-copolymerized petroleum resin may be removed using degassing and concentration processes.

The petroleum resin obtained using a series of the above-described processes includes a repeating unit derived from monomers, including cyclic olefins having at least one ethylenically unsaturated group selected from among C5-olefins, C9-olefins, and dicyclopentadiene of naphtha cracking. In the petroleum resin, silanes are copolymerized, and the proton content of the silanes, determined using $^1$H-NMR, is at least 2%, thereby ensuring curability.

The copolymerization of the silanes with the petroleum resin may be confirmed using various measurement and analysis methods, and examples of the methods may include XRF (X-ray fluorescence spectrometer), FT-IR, and $^1$H-NMR analyses. The relative content of the silanes in the total resin may be obtained using the XRF, the Si—O peak intensity of the silanes may be obtained using FT-IR, and the proton content of the silanes may be quantitatively obtained using $^1$H-NMR. In the present invention, the content of the silanes is defined to be determined using $^1$H-NMR, which is the quantitatively reliable optimum method.

In the curable petroleum resin obtained according to the present invention, the silanes may be copolymerized so that the proton content of the silanes is at least 1.7%, preferably 3%, and more preferably 7% or more.

The curable petroleum resin, in which the silanes are copolymerized at a high content, has a remarkably high silane content, compared to the case where the petroleum resin is reacted with the silane-coupling agent in the presence of the initiator to be modified at an end thereof.

The curable petroleum resin according to the present invention is advantageous in terms of curability when the proton content of the silanes is increased. However, in terms of uniformly satisfying the various physical properties required for application as a reactive adhesive, the practical benefit thereof may be small when the proton content of the silanes is 20% or more. Preferably, the proton content of the silanes may be within 10%.

This may be confirmed by an analysis method using the X-ray fluorescence spectrometer. In the curable petroleum resin of the present invention, an Si weight ratio, which is the weight ratio of a silicon (Si) element to all elements analyzed using the X-ray fluorescence spectrometer, may be at least 0.3 wt %, preferably 0.8 wt % or more, and more preferably 2 wt % or more.

The curable petroleum resin according to the present invention is advantageous in terms of curability when the Si weight ratio is increased. However, in terms of uniformly satisfying the various physical properties required for application as a reactive adhesive, the practical benefit thereof may be small when the Si weight ratio is 5% or more. Preferably, the proton content of the silanes may be within 3%.

The curable petroleum resin in which the silanes are copolymerized according to the present invention has a remarkably high Si weight ratio, compared to the case where the petroleum resin is reacted with the silane-coupling agent in the presence of the initiator to be modified at an end thereof.

The high silane content and Si weight ratio are attributable to the resin molecular structure in which Si is not located only at the end of the resin but is also distributed in the polymer chain, and this structural characteristic may be confirmed using $^{29}$Si NMR analysis.

The curable petroleum resin of the present invention may preferably have a weight average molecular weight (Mw) of 500 to 2000 in consideration of the occurrence of self-curing due to heat during the manufacturing process of the product.

Further, the curable petroleum resin of the present invention may preferably have a softening point of 70 to 150° C. in consideration of application thereof as an adhesive resin.

One exemplary aspect of the present invention provides a reactive adhesive composition including the curable petroleum resin manufactured using the manufacturing method according to the embodiments.

The reactive adhesive composition may be understood to be an adhesive composition including main components that can be crosslinked during a curing reaction.

It goes without saying that the reactive adhesive composition may include a curing agent if necessary.

MODE FOR INVENTION

A better understanding of the present invention may be obtained through the following Examples which are set forth to illustrate, but are not to be construed to limit the present invention.

Example 1: Manufacturing of Curable Petroleum Resin Using Thermal Polymerization In the Example of the present invention, only dicyclopentadiene is used as an example of a monomer used to manufacture a petroleum resin. However, a C5 fraction or a C9 fraction having an ethylenically unsaturated group may serve to ensure the same silane content as dicyclopentadiene. In addition to such cyclic olefins, when a diolefin is used as a co-monomer, a known method of manufacturing a petroleum resin is applicable thereto. Accordingly, the use of various co-monomers may be naturally included in the scope of the present invention.

(1) Raw Materials that were Used

Dicyclopentadiene (DCPD, Kolon Industries, Inc., purity of 80%)

Vinyltrimethoxysilane (TMVS. Reagent grade, products manufactured by Aldrich, purity of 99.99%)

Hysol (Kolon Industries, Inc., process products that include a non-polymerizable naphthene-based material as a main component and were used as a solvent)

(2) Process 312.5 g of DCPD (corresponding to 250 g of a reactant in consideration of purity), 62.5 g of TMVS (corresponding to an amount of 20 wt % based on the total weight of TMVS and the DCPD reactant), and a solvent, having a weight set so that the total concentration of the two components was 50 wt %, were added to a 1 L autoclave. Reaction devices were assembled after the addition of raw materials. In order to prevent undesired reactions such as a reaction with oxygen at high temperatures, substitution was performed using nitrogen and a predetermined pressure was applied.

The temperature of the reactor was increased to 275° C. The reaction time started to be measured at a reaction temperature, and the reaction was performed for 1 hour (among reaction conditions, the internal pressure of the reactor was 20 to 25 bar). When the reaction was finished, the target temperature was set to room temperature so as to perform cooling. After cooling to 30° C. or less was finished, the internal pressure was relieved, and the reactor was then opened to obtain a polymer.

In the polymer, an unreacted material and a solvent were included in addition to a polymerized material, and they were removed. Specifically, all of the polymer was placed in a 1 L four-neck glass kettle, and a vacuum was created at room temperature. The vacuum strength was maintained at 10 torr. After the vacuum was created, agitation was performed and the temperature was increased to 260° C. The concentration time started to be measured at 260° C., and the temperature was maintained for 10 min. In the state in which the concentration was finished, the vacuum state was released and the molten resin was obtained. After the resin was hardened, the physical properties thereof were measured.

Reference Example 1: Manufacture of Silane-Modified Petroleum Resin Using Grafting after Polymerization of DCPD Resin (1) Raw Materials that were Used Dicyclopentadiene (DCPD, Kolon Industries, Inc., purity of 80%)

Vinyltrimethoxysilane (TMVS. Reagent grade, products manufactured by Aldrich, purity of 99.99%)

Initiator: Benzoic peroxide

Hysol (Kolon Industries, Inc., process products that include a non-polymerizable naphthene-based material as a main component and were used as a solvent)

(2) Process 312.5 g of DCPD (corresponding to 250 g of a reactant in consideration of purity) and a solvent, weighing a quantity set so that the total concentration was 50 wt %, were added to a 1 L autoclave. Reaction devices were assembled after the addition of raw materials. In order to prevent undesired reactions such as a reaction with oxygen at high temperatures, substitution was performed using nitrogen, and a predetermined pressure was applied. The temperature of the reactor was increased to 275° C. The reaction time started to be measured at the reaction temperature, and the reaction was performed for 1 hour (among reaction conditions, the internal pressure of the reactor was 20 to 25 bar). When the reaction was finished, the target temperature was set to room temperature so as to perform cooling. After cooling to 30° C. or less was finished, the internal pressure was relieved, and the reactor was then opened to further add 62.5 g of TMVS (corresponding to an amount of 20 wt % based on the total weight of TMVS and the DCPD reactant) and 1.5 g of an initiator to a polymer.

Reaction devices were assembled after the addition of raw materials. In order to prevent undesired reactions such as a reaction with oxygen at high temperatures, substitution was performed using nitrogen and a predetermined pressure was applied.

The temperature of the reactor was increased to 220° C. The reaction time started to be measured at the reaction temperature, and the reaction was performed for 2 hours (among the reaction conditions, the internal pressure of the reactor was 20 to 25 bar). When the reaction was finished, the target temperature was set to room temperature so as to perform cooling. After cooling to 30° C. or less was finished, the internal pressure was relieved, and the reactor was then opened to obtain a final polymer.

In the polymer, an unreacted material and a solvent were included, in addition to a polymerized material, and were then removed. Specifically, all of the polymer was placed in a 1 L four-neck glass kettle, and a vacuum was created at room temperature. The vacuum strength was maintained at 10 torr. After the vacuum was created, agitation was performed and the temperature was increased to 260° C. The concentration time started to be measured at 260° C., and the temperature was maintained for 10 min. In the state in which the concentration was finished, the vacuum state was released and the molten resin was obtained. After the resin was hardened, the physical properties thereof were measured.

Reference Example 2: Manufacture of Silane-Modified Petroleum Resin Using Grafting of Complete Petroleum Resin Products (1) Raw Materials that were Used C5-based resin: HIKOREZ A-1100 (Kolon Industries, Inc.)

Vinyltrimethoxysilane (TMVS, Reagent grade, products manufactured by Aldrich, purity of 99.99%)

Initiator: Benzoic peroxide

Xylene: Industrial, solvent (2) Process 300 g of a C5-based resin, 90 g of TMVS, 1.5 g of an initiator, and 200 g of xylene were weighed and added to a 1 L autoclave. Reaction devices were assembled after the addition of raw materials. In order to prevent undesired reactions, such as a reaction with oxygen at high temperatures, substitution was performed using nitrogen and a predetermined pressure was applied.

The temperature of the reactor was increased to 220° C. The reaction time started to be measured at the reaction temperature, and the reaction was performed for 2 hours (among the reaction conditions, the internal pressure of the reactor was 20 to 25 bar). When the reaction was finished, the target temperature was set to room temperature so as to perform cooling. After cooling to 30° C. or less was finished, the internal pressure was relieved, and the reactor was then opened to obtain a polymer.

In the polymer, an unreacted material and a solvent were included in addition to a polymerized material, and they were removed. Specifically, all of the polymer was placed in a 1 L four-neck glass kettle, and a vacuum was created at room temperature. The vacuum strength was maintained at 10 torr. After the vacuum was created, agitation was performed and the temperature was increased to 260° C. The concentration time started to be measured at 260° C., and the temperature was maintained for 10 min. In the state in which the concentration was finished, the vacuum state was released and the molten resin was obtained. After the resin was hardened, the physical properties thereof were measured.

The evaluation of the physical properties is described below.

(1) Yield: The amount of the resin remaining after the concentration process was expressed as a percentage, based on the weight of the polymerized oil obtained during polymerization.

(2) Softening point: The softening point was measured according to an ASTM E 28 standard. The sample was melted and poured on a spherical structure. After the resin was hardened, the hardened resin was provided on a softening point measuring apparatus, and a steel ball was placed on the hardened resin. While the temperature was increased at 0.5° C./min, the temperature was measured when the steel ball fell down after the resin melted.

(3) FT-IR (FT-IR Spectrophotometers, Perkinelmer company, Model name: spectrum 100)

(4) Molecular weight: The polystyrene-reduced weight average molecular weight (Mw), number average molecular weight (Mn), and Z-average molecular weight (Mz) were obtained using gel permeation chromatography (Product manufactured by Hewlett-Packard Co., Model name HP-1100). The polymer to be measured was dissolved in tetrahydrofuran so that the concentration was 4000 ppm, and the resulting solution was injected in an amount of 100 μl into the GPC. Tetrahydrofuran was used as the mobile phase of the GPC and was added at a flow rate of 1.0 mL/min, and analysis was performed at 30° C. As for the column, three PIgels (1,000+500+100 Å), manufactured by Agilent Company, were connected in series. Measurement was performed at 30° C. using an RI detector (Product manufactured by Hewlett-Packard Co., HP-1047A) as a detector. The measured weight average molecular weight was divided by the number average molecular weight, thus calculating a PDI (polydispersity index).

(5) Proton content (%) of silanes determined using NMR

An $^1$H-NMR analysis graph was obtained using $CdCl_3$ as a solvent and equipment manufactured by Zeol Co. (Model name FT-NMR JNM-LA400). In the NMR analysis graph, the proton content (%) of the silanes was calculated using the ratio (%) of the area of the peak, corresponding to R' (alkoxy group) derived from the silanes, to the integral value of all peaks.

(6) Analysis of Si weight ratio using X-ray fluorescence spectrometer (hereinafter, XRF)

XRF analysis was performed using the following condition and devices.

Sample manufacturing condition: Pressing for 3 min under 500 kgf/cm³

Sample thickness: 0.5 mm pellet

Analysis device: Shimadzu XRF-1800 (Sequential X-ray fluorescence spectrometer)

Analysis condition: X-ray power 40 kV, 95 mA; Aperture 10 mm; Speed 2 deg./min; Step angle 0.02 deg.; Measurement time 3 min The Si weight ratio was defined as the weight ratio of the silicon (Si) element to all elements analyzed using the XRF under the above-described conditions.

(7) $^{29}$Si NMR analysis $^{29}$Si NMR spectrum analysis was performed in order to confirm the bonding position of silicon in the fine structure of the resin.

Device name: Jeol FT-NMR JNM-ECX500

Measurement sample: (0.8 g of analysis sample+one drop of 100%-concentration TMS (tetramethyl silane))/0.8 mL of $CDCl_3$ The physical properties of the silane-modified petroleum resin obtained in the Example and the Reference Examples were measured using the above-described methods, and the results are described in the following Table 1.

TABLE 1

| Physical properties | | Example 1 | Reference Example 1 | Reference Example 2 | Control (HIKOREZ A-1100) |
|---|---|---|---|---|---|
| Softening point (° C.) | | 97.5 | 108.2 | 100 | 100 |
| Si-O peak intensity (FT-IR) | | Observed (Absorbance 0.1731) | Observed (Absorbance 0.0339) | Observed | Not observed |
| H-NMR silane proton content (%) | | 7.6 | 1.45 | 1.1 | 0 |
| Si weight ratio (wt %) | | 2.21 | — | — | 0 |
| Molecular weight | Mn | 364 | 310 | 1200 | 1227 |
| | Mw | 806 | 689 | 2146 | 2181 |
| | Mz | 7858 | 6419 | 4398 | 4455 |
| | PDI | 2.21 | 2.22 | 1.79 | 1.78 |

From the summary of Table 1, it can be seen that when the initiator and the silanes are added to the complete resin product to perform grafting as in the Reference Examples, the grafting rate is only about 1%. However, it can be seen that when the silanes are added as a raw material during the polymerization and the thermal polymerization is performed, an addition reaction readily occurs and the silane content is high even though the initiator is not used.

Figure 2:
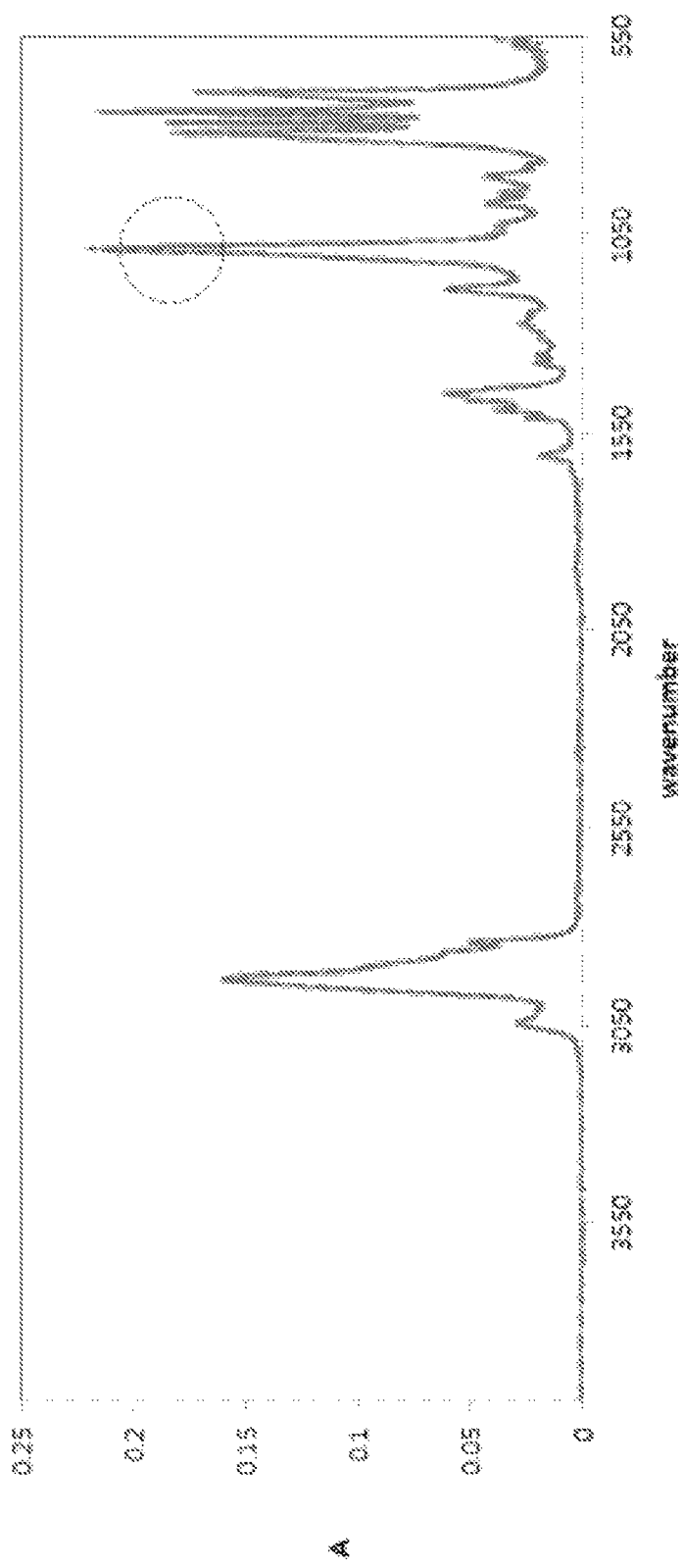
FIG. 2 is a graph of the FT-IR analysis of a curable petroleum resin obtained in Example 1 according to the present invention.
Figure 3:
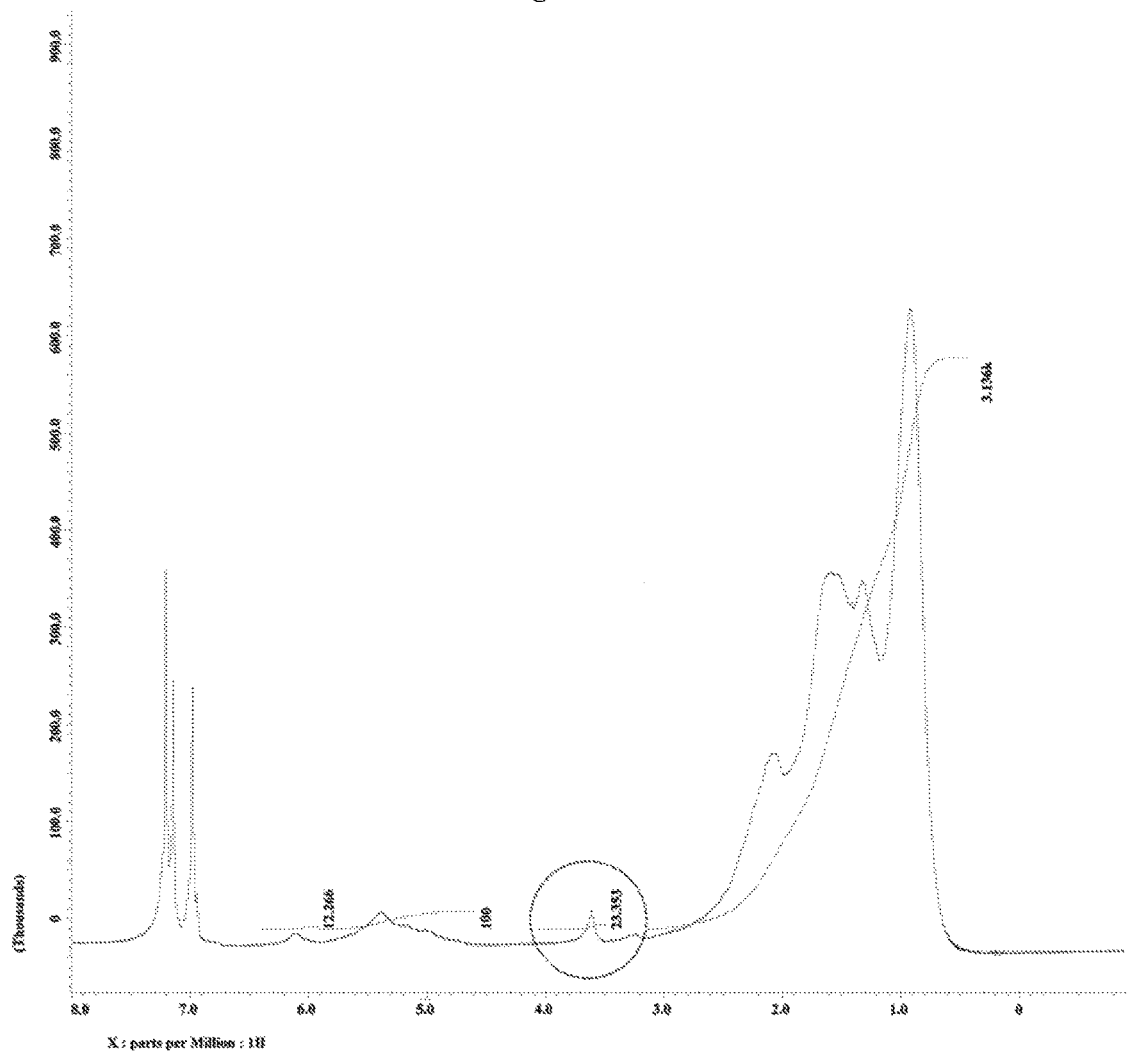
FIG. 3 is a graph of the $^1$H-NMR analysis of the resin (Reference Example 2) obtained by grafting silane of the product, commercially available as the C5-based resin, in the presence of the initiator.
Figure 4:
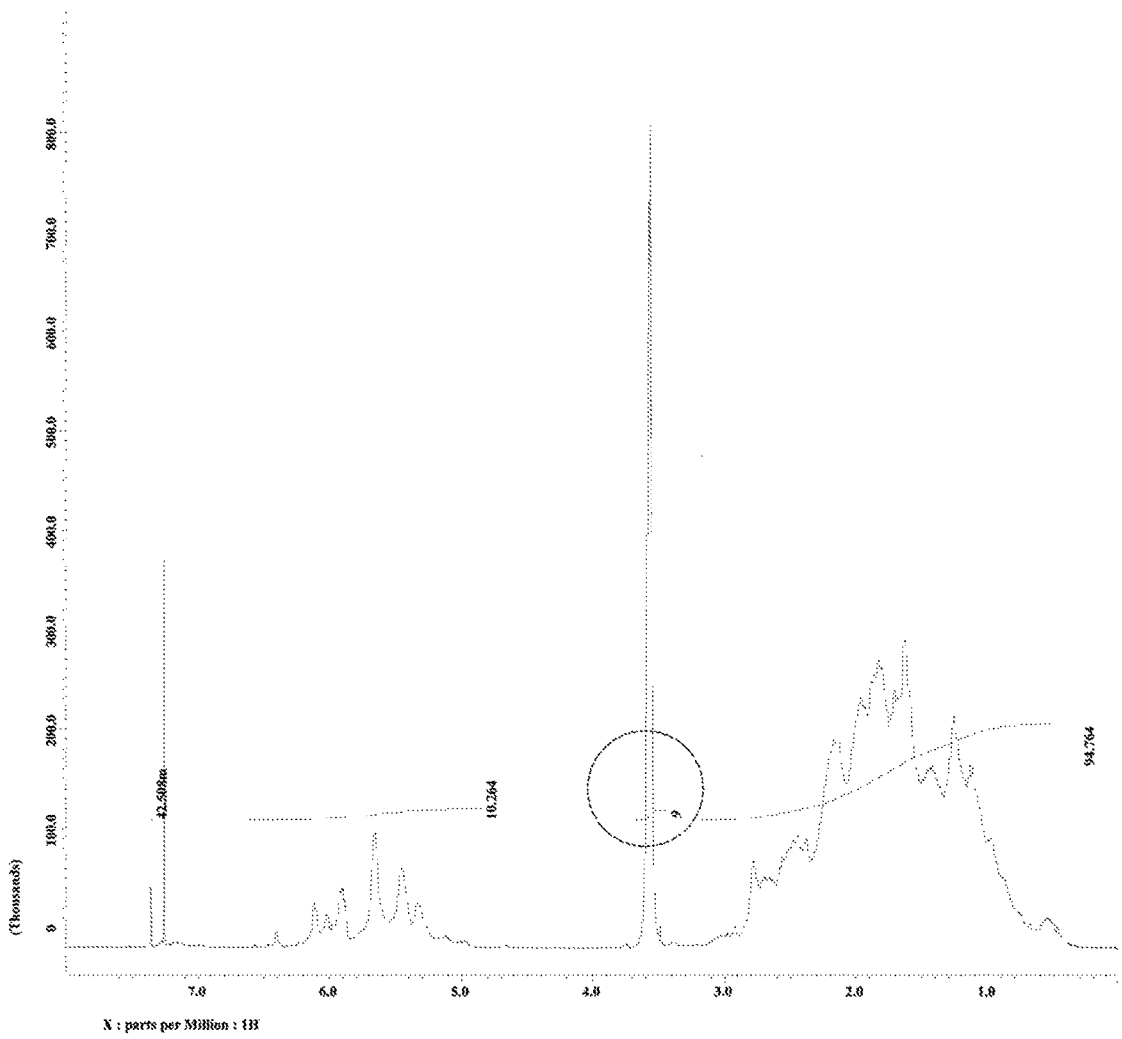
FIG. 4 is a graph of the $^1$H-NMR analysis of the curable petroleum resin obtained in Example 1 according to the present invention.

For reference, the results of confirmation of copolymerization or grafting of the silanes using FT-IR are shown in FIG. 1 (Control—upper graph and Reference Example 2—lower graph) and FIG. 2 (Example 1). The results of confirmation of the proton peak of Si—$OCH_3$, which is the intrinsic peak derived from TMVS, and the size of the peak using $^1$H-NMR are shown in FIG. 3 (Referential Example 2) and FIG. 4 (Example 1).

Meanwhile, the Si weight ratio obtained using the result of the XRF analysis was 2.21%, indicating a high Si weight ratio.

Further, it can be confirmed that the present invention is different from a conventional resin, the end of which is modified with the silanes, in view of the position of Si bonds in the chain of the resin. The difference can be confirmed through comparison with the graph obtained using $^{29}$Si NMR (FIG. 5).

Figure 5:
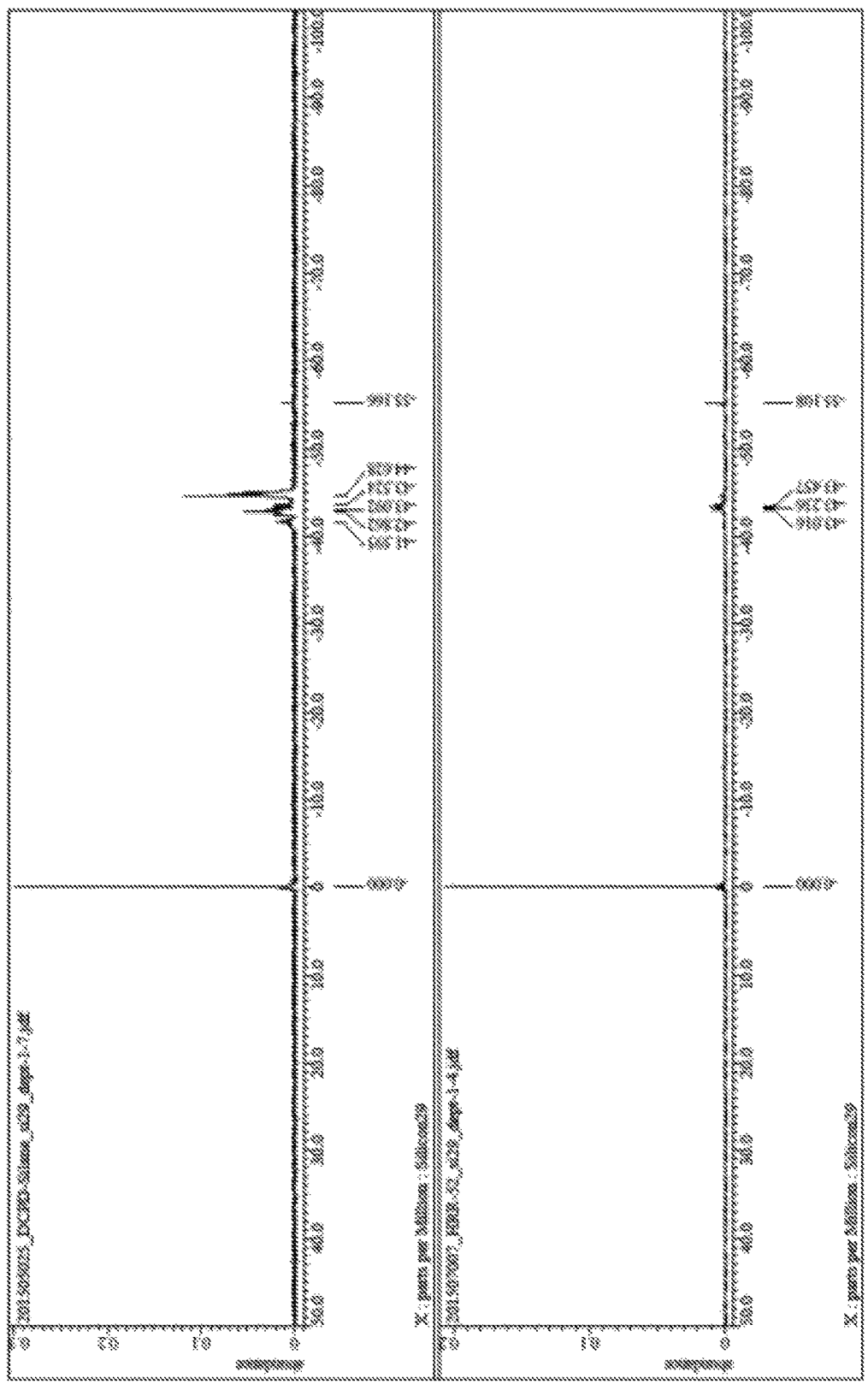
FIG. 5 is a comparative graph of the $^{29}$Si-NMR analysis of the curable petroleum resin obtained in Example 1 according to the present invention and a petroleum resin according to Reference Example 1, and in the graph, upper and lower parts correspond to the result of Example 1 and the result of Reference Example 1, respectively.

The upper graph in FIG. 5 is the graph of Example 1, and the lower graph is the graph of Reference Example 1. In the resin according to Example 1, Si bond peaks were analyzed and classified into approximately three groups between −41 and −45 ppm. In contrast, in Reference Example 1, a weak peak was observed at about −43 ppm.

From the results, it can be seen that in Reference Example 1, the double bond at the end of the polymer and the silanes reacted, and in the resin of Example 1 according to the present invention, Si is present in the polymer bond as well as at the end of the polymer.

Examples 2 to 5: Experiment on Tendency Depending on Content of TMVS

The curable petroleum resin was manufactured using the same method as in Example 1, except that the content of TMVS was changed to the values in the following Table 2.

The physical properties were measured using the above-described methods, and the results are described in the following Table 2.

TABLE 2

| Physical properties | | Example 2 | Example 1 | Example 3 | Example 4 | Example 5 |
|---|---|---|---|---|---|---|
| Content of TMVS (wt % based on total weight of DCPD and TMVS) | | 25 | 20 | 16 | 10 | 5 |
| Yield (%) | | 25.8 | 27.8 | 28.8 | 30.3 | 33.0 |
| Softening point (° C.) | | 92.5 | 97.5 | 107.0 | 115.5 | 122.0 |
| H-NMR silane proton content (%) | | 9.9 | 7.6 | 6.0 | 3.5 | 1.7 |
| Si weight ratio (wt %) | | — | 2.21 | — | 0.82 | — |
| Si—O peak intensity (FT-IR) | | 0.2137 | 0.1731 | 0.1444 | 0.0895 | 0.0461 |
| Molecular weight | Mn | 374 | 364 | 365 | 352 | 354 |
| | Mw | 801 | 806 | 799 | 822 | 821 |
| | Mz | 7509 | 7858 | 7345 | 7846 | 7428 |
| | PDI | 2.13 | 2.21 | 2.19 | 2.33 | 2.32 |

From the result of Table 2, it can be confirmed that as the content of the silanes is increased, the yield or the softening point is reduced but there is no significant change in molecular weight. Further, with respect to an increase in silane content, it is considered that as the amount of the silanes used is increased, the silanes are attached to the main chain rather than to monomer DCPD, which reduces the degree of polymerization of DCPD. Since the molecular weights of DCPD and TMVS are similar to each other, the resins have slightly different molecular weights.

Examples 6 and 7: Experiment on Tendency Depending on Content of TMVS

The curable petroleum resin was manufactured using the same method as in Example 1, except that the reaction time of thermal polymerization was changed to the values in the following Table 3.

The physical properties were measured using the above-described methods, and the results are described in the following Table 3.

TABLE 3

| Physical properties | | Example 1 | Example 6 | Example 7 |
|---|---|---|---|---|
| Reaction time of thermal polymerization (hr) | | 1 | 2 | 3 |
| Yield (%) | | 27.8 | 33.9 | 39.3 |
| Softening point (° C.) | | 97.5 | 118.8 | SP was not measured |
| H-NMR silane proton content (%) | | 7.6 | 8.2 | 8.4 |
| Si weight ratio (wt %) | | 2.21 | — | — |
| Si-O peak intensity (FT-IR) | | 0.1731 | 0.1881 | 0.1957 |
| Molecular weight | Mn | 364 | 451 | 487 |
| | Mw | 806 | 947 | 1051 |
| | Mz | 7858 | 5398 | 4383 |
| | PDI | 2.21 | 2.1 | 2.16 |

From the results of Table 3, it can be seen that the yield, the softening point, and the molecular weight were increased as the reaction time of thermal polymerization was increased. Further, the silane content was increased, suggesting that the silanes constituted the main chain in a monomer or oligomer form.

Experimental Example: Evaluation of Curability 10 g of each of the petroleum resins obtained in Example 1, among the Examples, and Reference Examples 1 and 2 was weighed on an aluminum dish to be prepared. The prepared petroleum resins were heated at 200° C. to observe the change in surface state over time.

A curing catalyst was not added during the above-described procedure.

Figure 6:
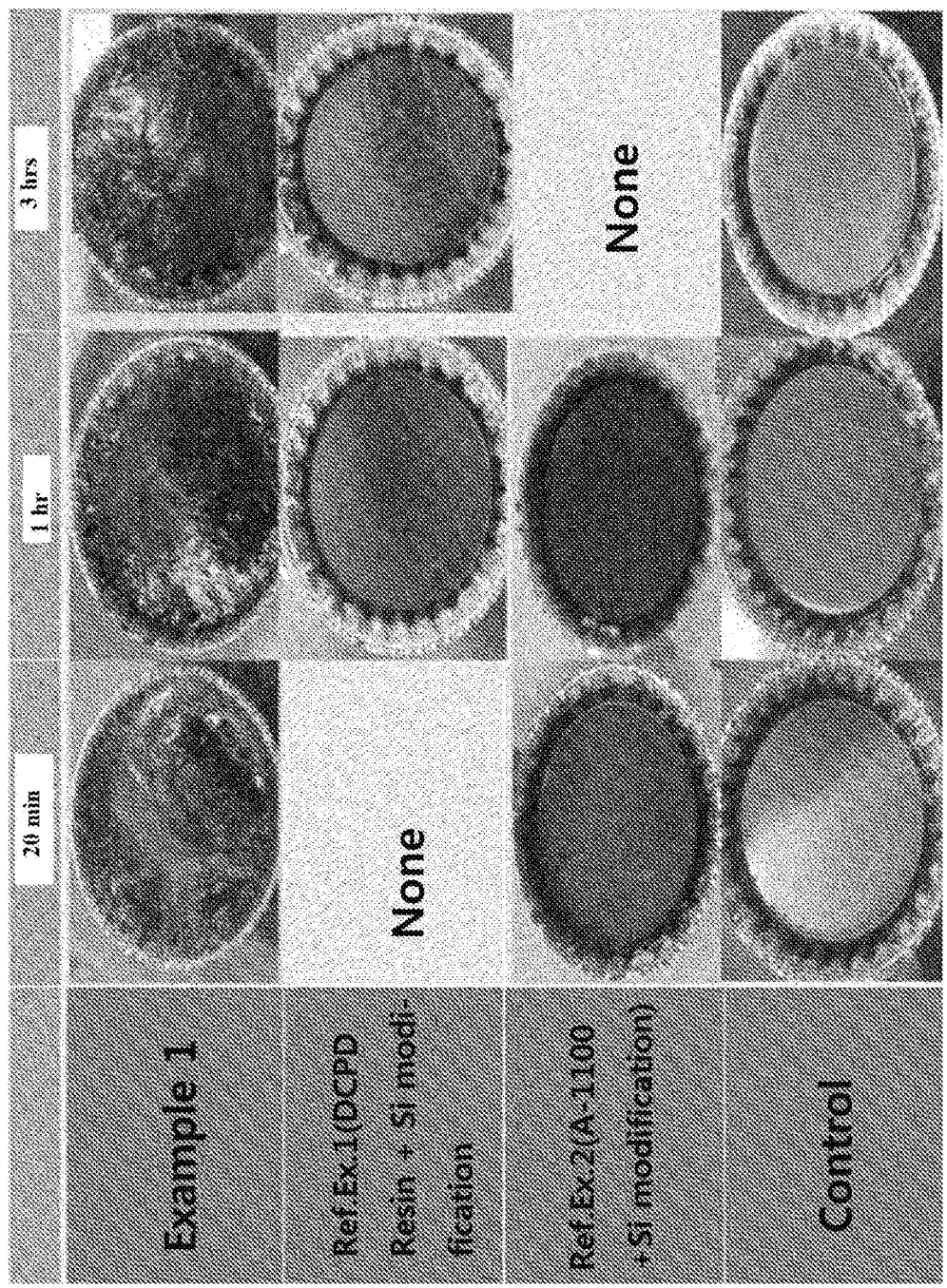
FIG. 6 is a picture showing the results of a curability evaluation experiment on the curable petroleum resin obtained in Example 1 according to the present invention, and petroleum resins according to Reference Examples 1 and 2 and the Control.

The results are shown in FIG. 6. The curing behavior of the surface of the general thermoplastic petroleum resin (Control: HIKOREZ A-1100) is not shown, but the curable petroleum resin started to be cured on the surface thereof. The curing rate was increased as the silane content was increased. That is, in Example 1, the resin was cured within a short period of time. On the other hand, in the case of the resin in which the silanes were grafted in a small amount at the end of the resin, as in Reference Examples 1 and 2, slight curing occurred over time but the reactivity was not sufficient.

INDUSTRIAL APPLICABILITY

These results support that the curable petroleum resin of the present invention is provided, thus making it possible to use the petroleum resin as a reactive adhesive.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method of manufacturing a curable petroleum resin, the method comprising:
   a process of thermally polymerizing, in the absence of an initiator and in the absence of a Friedel-Craft catalyst or Lewis acid catalyst, a composition for polymerization which includes (a) monomers, including cyclic olefins having at least one ethylenically unsaturated group selected from among C5 fractions, C9 fractions, and dicyclopentadiene of naphtha cracking, and (b) one or more silanes of the following Chemical Formula 1:

$$CH_2\!=\!CR\!-\!(COO)_x(C_nH_{2n})_y SiR'_3 \qquad \text{Chemical Formula 1}$$

where R is a hydrogen atom or a methyl group; x and y are 0 or 1, provided that y is 1 when x is 1; n is an integer of 1 to 12; and R's are each independently an alkoxy group having 1 to 12 carbon atoms, an aryloxy group, an araloxy group, an aliphatic acyloxy group having 1 to 12 carbon atoms, an amino or substituted amino group, or a lower alkyl group having 1 to 6 carbon atoms, provided that two or less of the three R' groups are alkyl groups.

2. The method of claim 1, wherein the silanes are selected from the group consisting of vinyltrimethoxysilane, vinyltriethoxysilane, and 3-(trimethoxysilyl)propyl methacrylate.

3. The method of claim 1, wherein the thermally polymerizing the composition is performed at a reaction temperature of 150 to 300° C. for 1 to 3 hours under a predetermined pressure.

4. The method of claim 1, wherein the monomers include dicyclopentadiene.

5. The method of claim 1, wherein the composition for polymerization includes a non-polymerizable solvent having no ethylenically unsaturated double bond.

6. The method of claim 1, wherein the composition for polymerization includes 5 to 50 wt % of the silanes based on a total weight of the silanes and the monomers.

7. The method of claim 5, wherein the composition for polymerization includes the non-polymerizable solvent in an amount set so that a total concentration of monomers and silanes is 30 to 70 wt %.

8. The method of claim 1, wherein the method includes degassing and concentration processes after the thermally polymerizing the composition.

9. A curable petroleum resin comprising:
a repeating unit derived from monomers including cyclic olefins having at least one ethylenically unsaturated group selected from among C5 fractions, C9 fractions, and dicyclopentadiene of naphtha cracking,
wherein silanes are copolymerized and a proton content of the silanes, determined using $^1$H-NMR, is at least 1.7%.

10. The curable petroleum resin of claim 9, wherein the proton content of the silanes is at least 7%.

11. The curable petroleum resin of claim 9, wherein an Si weight ratio, which is a weight ratio of a silicon (Si) element to all elements, analyzed using an X-ray fluorescence spectrometer, is at least 0.3 wt %.

12. The curable petroleum resin of claim 11, wherein the Si weight ratio is at least 2 wt %.

13. The curable petroleum resin of claim 9, wherein the silanes are at least one selected from among materials represented by the following Chemical Formula 1:

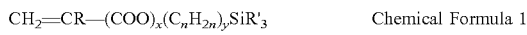

$$CH_2=CR-(COO)_x(C_nH_{2n})_y SiR'_3 \quad \text{Chemical Formula 1}$$

where R is a hydrogen atom or a methyl group; x and y are 0 or 1, provided that y is 1 when x is 1; n is an integer of 1 to 12; and R's are each independently an alkoxy group having 1 to 12 carbon atoms, an aryloxy group, an araloxy group, an aliphatic acyloxy group having 1 to 12 carbon atoms, an amino or substituted amino group, or a lower alkyl group having 1 to 6 carbon atoms, provided that two or less of the three R' groups are an alkyl group.

14. The curable petroleum resin of claim 13, wherein the silanes are selected from the group consisting of vinyltrimethoxysilane, vinyltriethoxysilane, and 3-(trimethoxysilyl)propyl methacrylate.

15. The curable petroleum resin of claim 9, wherein the monomers include dicyclopentadiene.

16. The curable petroleum resin of claim 15, wherein a weight average molecular weight (Mw) is 500 to 2000.

17. The curable petroleum resin of claim 15, wherein a softening point is 70 to 150° C.

* * * * *